(12) United States Patent
Lee et al.

(10) Patent No.: US 8,687,138 B2
(45) Date of Patent: Apr. 1, 2014

(54) COUPLING MEANS AND DISPLAY DEVICE USING THE SAME

(75) Inventors: Sang-Rae Lee, Gyeongju-si (KR); Gi Bin Kim, Annyang-si (KR); Hak-Mo Hwang, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 1054 days.

(21) Appl. No.: 12/292,135

(22) Filed: Nov. 12, 2008

(65) Prior Publication Data

US 2009/0180049 A1 Jul. 16, 2009

(30) Foreign Application Priority Data

Nov. 15, 2007 (KR) ......................... 10-2007-0116953

(51) Int. Cl.
| | | |
|---|---|---|
| *G02F 1/1333* | (2006.01) | |
| *G06F 1/16* | (2006.01) | |
| *H05K 7/20* | (2006.01) | |
| *H05K 5/00* | (2006.01) | |
| *F21V 7/04* | (2006.01) | |

(52) U.S. Cl.
USPC ........ 349/58; 345/905; 361/679.02; 361/714; 361/752; 362/632; 362/633; 362/634

(58) Field of Classification Search
USPC .......... 349/73, 58; 345/905; 361/679.02, 714, 361/752; 362/632–634
See application file for complete search history.

(56) References Cited

U.S. PATENT DOCUMENTS

| | | | | |
|---|---|---|---|---|
| 4,907,767 A | * | 3/1990 | Corsi et al. ........................ | 248/49 |
| 6,295,103 B1 | * | 9/2001 | Yamatani et al. ............... | 349/58 |
| 6,667,780 B2 | * | 12/2003 | Cho ................................. | 349/58 |
| 6,678,152 B2 | * | 1/2004 | Kim .......................... | 361/679.21 |
| 7,050,128 B2 | * | 5/2006 | Lee et al. ........................ | 349/58 |
| 7,068,331 B2 | * | 6/2006 | Kim ................................. | 349/58 |
| 7,287,896 B2 | * | 10/2007 | Okamoto et al. ............. | 362/634 |
| 7,522,228 B2 | * | 4/2009 | An .................................. | 349/58 |
| 2002/0021564 A1 | * | 2/2002 | Cho et al. ........................ | 362/97 |
| 2006/0279957 A1 | * | 12/2006 | Kwon et al. .................. | 362/378 |
| 2007/0147073 A1 | * | 6/2007 | Sakai et al. .................... | 362/607 |
| 2007/0273807 A1 | * | 11/2007 | Yun ................................. | 349/58 |

FOREIGN PATENT DOCUMENTS

| | | |
|---|---|---|
| CN | 1540405 | 10/2004 |
| CN | 1574150 | 2/2005 |
| CN | 1605912 | 4/2005 |
| CN | 101080134 | 11/2007 |
| JP | 2006-147460 | 6/2006 |
| JP | 2006-344602 A | 12/2006 |
| KR | 20-1999-012482 U | 4/1999 |
| KR | 20-0295588 Y1 | 11/2002 |
| KR | 10-2003-0028152 A | 4/2003 |
| KR | 10-2004-0107886 A | 12/2004 |
| TW | 200612804 | 4/2006 |

* cited by examiner

*Primary Examiner* — Hoan C Nguyen

(74) *Attorney, Agent, or Firm* — McKenna Long & Aldridge, LLP

(57) ABSTRACT

A display module includes: upper and lower supporting means facing and spaced apart from each other; a display device between the upper and lower supporting means; a middle supporting means surrounding the display device; and a plurality of coupling means combining the upper, middle and lower supporting means to fix and support the display device, wherein each of the plurality of coupling means includes a hook and each of the upper and lower supporting means has a through hole corresponding to the hook.

7 Claims, 12 Drawing Sheets

COUPLING MEANS AND DISPLAY DEVICE USING THE SAME

This application claims the benefit of Korean Patent Application No. 2007-0116953, filed on Nov. 15, 2007, which is hereby incorporated by reference in its entirety.

TECHNICAL FIELD

The present application relates to a coupling means, and more particularly, to a display device having a narrow bezel region due to the coupling means.

BACKGROUND OF THE INVENTION

Until recently, cathode-ray tubes (CRTs) have been typically used as a display device. More recently, liquid crystal display (LCD) devices have been the subject of research and development because of their superior visibility, low power consumption and low heat emission as compared with the CRTs. Accordingly, the LCD devices with another flat panel display such as plasma display panels (PDPs) and field emission displays (FEDs) have been widely used as a next generation display device for a cellular phone, a monitor and a television.

LCD devices use optical anisotropy and polarization properties of liquid crystal molecules of a liquid crystal layer to produce an image. The liquid crystal molecules have long and thin shapes, and because of the optical anisotropy property, the polarization of light varies with the alignment direction of the liquid crystal molecules. The alignment direction of the liquid crystal molecules can be controlled by varying the intensity of an electric field applied to the liquid crystal layer. Accordingly, a typical LCD device includes two substrates spaced apart and facing each other and a liquid crystal layer interposed between the two substrates. Each of the two substrates includes an electrode on a surface facing the other of the two substrates. A voltage is applied to each electrode to induce an electric field between the electrodes and the arrangement of the liquid crystal molecules as well as the transmittance of light through the liquid crystal layer is controlled by varying the intensity of the electric field, thereby displaying images.

Since LCD devices are non-emissive type display devices, a light source is required to display images. A backlight unit is disposed under a liquid crystal panel and light from the backlight unit is supplied to the liquid crystal panel. As a result, the light transmittance is controlled by the alignment of the liquid crystal molecules to display images.

FIG. 1 is a plan view showing a multi-vision display device according to the related art. The multi-vision display device includes at least two independent LCD devices coupled with each other. In FIG. 1, a multi-vision display device 5 includes four liquid crystal display (LCD) devices 80 disposed in matrix. The four LCD devices 80 display different images or equal images, respectively, to display various images. Alternatively, the four LCD devices 80 display four partial images that constitute a single image. The multi-vision display device 5 further includes a frame 72, an upper supporting means 70 and a lower supporting means (not shown). The frame 72 has a rectangular ring shape and the four LCD devices 80 are disposed on the frame 72 to be separated from each other. The upper supporting means 70 and the lower supporting means are formed by a press process. The upper supporting means 70 corresponds to gaps between the four LCD devices 80 to support the four LCD devices 80 at an upper position. An active area AA of the multi-vision display device 5 is defined by an image display region of the four LCD devices 80. The four LCD devices 80 are coupled to form the multi-vision display device 5 using a coupling means T having a plurality of screws 90 in a non-active area NAA corresponding to a boundary portion of the frame 72 and a space between the four LCD devices 80.

FIGS. 2A and 2B are cross-sectional views showing an exemplary coupling portion and another exemplary coupling portion, respectively, for a multi-vision display device according to the related art. In FIG. 2A, the coupling means T includes a screw 90. Upper and lower supporting means 70 and 15 are spaced apart from each other and a middle supporting means 60 is disposed between the upper and lower supporting means 70 and 15. The upper, middle and lower supporting means 70, 60 and 15 are combined with each other by the screw 90. The upper, middle and lower supporting means 70, 60 and 15 have a through hole 85 having a cylindrical shape, and a screw thread is formed on a side surface of the through hole 85 of the middle and lower supporting means 60 and 15. For strong fixation, the lower supporting means 15 further has a protrusion F corresponding to a circumference of the through hole 85, which is referred to as a boss-processed structure. In FIG. 2B, the lower supporting means 15 has a bent protrusion H corresponding to a circumference of the through hole 85 for stronger fixation, which is referred to as an emboss-processed structure. In FIGS. 2A and 2B, each of the protrusion F and the bent protrusion H has elasticity to fix the screw 90 strongly.

Although the strong fixation is obtained in the multi-vision display device 5, the boss-processed structure or the emboss-processed structure requires a sufficient area. For example, when the multi-vision display device 5 has the through hole 85 having a first diameter B1, the boss-processed structure of FIG. 2A may require an area corresponding to a second diameter B2 greater than the first diameter B1 on the basis of the middle supporting means 60 and the protrusion F, and the emboss-processed structure of FIG. 2B may require an area corresponding to a third diameter B3 greater than the first diameter B1 on the basis of the middle supporting means 60 and the bent protrusion H. As a result, each of the boss-processed structure and the emboss-processed structure requires a greater area than the screw 90 corresponding to the first diameter B1. Specifically, although the emboss-processed structure has an advantage in strong fixation, the emboss-processed structure requires a greater area for the screw 90 than the boss-processed structure.

In the multi-vision display device 5 having the active area AA and the non-active area NAA, reduction of the non-active area NAA is necessary to increase the active area AA. However, there is a limitation in reduction of the non-active area NAA, i.e., reduction in a width X of the non-active area NAA, because the structure for fixation of the four LCD devices 80 to the upper, middle and lower supporting means 70, 60 and 15 requires the greater area than the screw 90.

SUMMARY OF THE INVENTION

A coupling means of a hook type includes: a body; an upper extension extending from top side ends of the body outwardly; and a lower extension extending from a bottom end of the body outwardly.

In another aspect, a coupling means of a plate spring type includes: a body; an upper extension extending from top side ends of the body outwardly; a lower extension extending from a bottom end of the body outwardly; and a plate spring fixing the upper extension.

In another aspect, a coupling means of a sliding type includes: a body integrated with and vertically extending from a lower supporting means; and an upper extension extending from top side ends of the body outwardly.

In another aspect, a display module includes: upper and lower supporting means facing and spaced apart from each other; a display device between the upper and lower supporting means; a middle supporting means surrounding the display device; and a plurality of coupling means combining the upper, middle and lower supporting means to fix and support the display device, wherein each of the plurality of coupling means includes a hook and each of the upper and lower supporting means has a through hole corresponding to the hook.

In another aspect, a liquid crystal display module includes: a bottom frame; a reflective plate on the bottom frame; a lamp over the reflective plate; a side supporter fixing ends of the lamp; a plurality of optical means over the lamp; a liquid crystal panel over the plurality of optical means; a main frame surrounding the liquid crystal panel; a top frame surrounding a top edge of the liquid crystal panel; a plurality of coupling means combining the bottom, main and top frames to fix and support the liquid crystal panel, wherein each of the plurality of coupling means includes a hook and each of the bottom, main and top frames has a through hole corresponding to the hook.

In another aspect, a multi-vision display device includes: a frame; a plurality of liquid crystal display (LCD) devices in matrix on the frame and separated from each other; upper and lower supporting means covering gaps between two of the plurality of LCD devices; and a plurality of coupling means combining the upper and lower supporting means to fix and support the plurality of LCD devices, wherein each of the plurality of coupling means includes a hook and each of the upper and lower supporting means has a through hole corresponding to the hook.

BRIEF DESCRIPTION OF THE DRAWINGS

The accompanying drawings, which are included to provide a further understanding of the invention and are incorporated in and constitute a part of this specification, illustrate embodiments of the invention.

DETAILED DESCRIPTION OF THE ILLUSTRATED EMBODIMENTS

Reference will now be made in detail to embodiments which are illustrated in the accompanying drawings. Wherever possible, similar reference numbers will be used to refer to the same or similar parts.

Figure 3A:
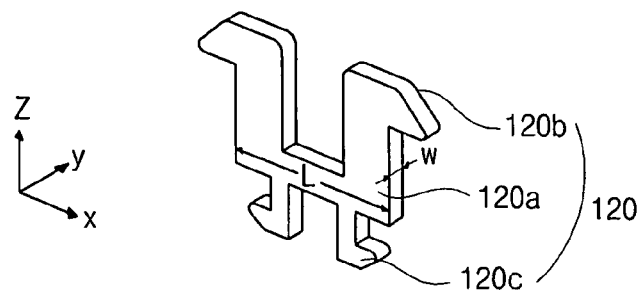
FIG. 3A is a perspective views showing a hook of a coupling means for a multi-vision display device according to a first embodiment of the present invention.
Figure 3B:
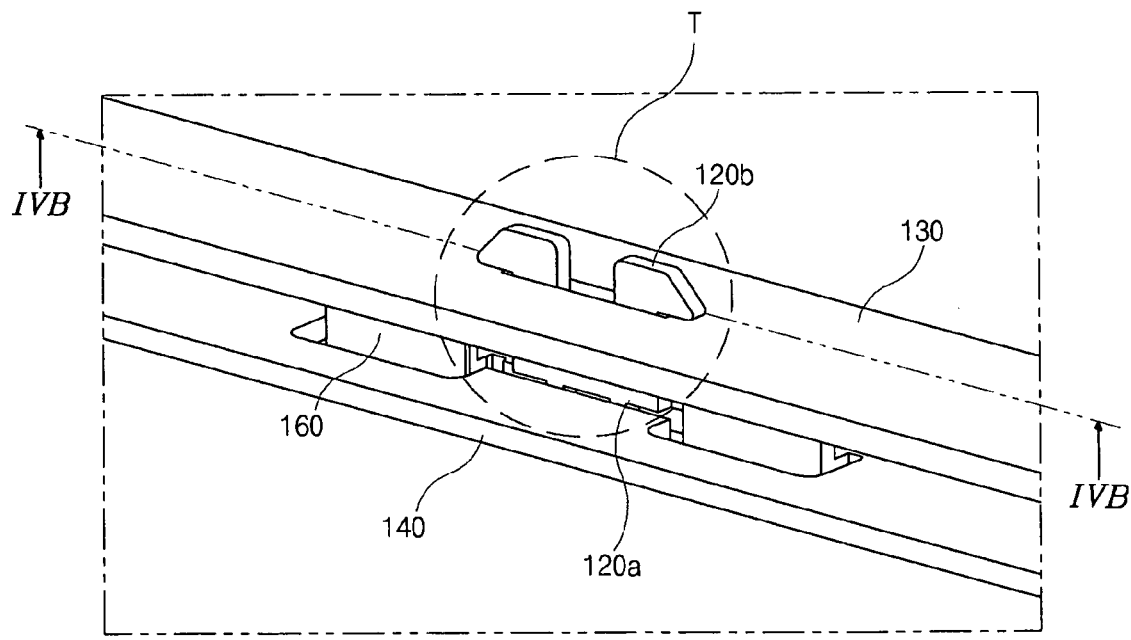
FIG. 3B is a perspective view showing a multi-vision display device in an assembled state according to a first embodiment of the present invention.

FIG. 3A is a perspective views showing a hook of a coupling means for a multi-vision display device according to a first embodiment of the present invention and FIG. 3B is a perspective view showing a multi-vision display device in an assembled state according to a first embodiment of the present invention.

In FIGS. 3A and 3B, upper and lower supporting means 130 and 140 are vertically spaced apart from each other, and a middle supporting means 160 is disposed between the upper and lower supporting means 130 and 140. Although not shown, the middle supporting means 160 surrounds a display device. The upper, middle and lower supporting means 130, 160 and 140 are combined with each other by a hook 120 of a coupling means T to fix and support the display device. The hook 120 includes a body 120a, an upper extension 120b and a lower extension 120c. The body 120a has a U-shaped plate, and the upper extension 120b horizontally extends from top side ends of the body 120a toward outside along an x-axis. The lower extension 120c vertically extends from a bottom end of the body 120a along a z-axis and then horizontally bends toward outside along the x-axis. The upper extension 120b is parallel to the upper supporting means 130 so that the upper extension 120b can be fixed to the upper supporting means 130, and the lower extension 120c has a pair of L-shaped plates so that the lower extension 120c can be fixed to the lower supporting means 140. In addition, the hook 120 has a symmetric shape with respect to a central vertical line. The body 120a, the upper extension 120b and the lower extension 120c of the hook 120 may have a single body of an elastic material.

The middle supporting means 160 is disposed at both sides of the hook 120 to support and separate the upper and lower supporting means 130 and 140. For example, the middle supporting means 160 may be integrated with or may be independently formed from the lower supporting means 140.

The upper and lower supporting means 130 and 140 may be separated from each other by a predetermined distance due to the middle supporting means 160.

The hook 120 is applied to another display device. For example, the hook 120 may be applied to an LCD module. Although not shown, the LCD device includes a liquid crystal panel, a backlight unit, a main frame, a top frame and a bottom frame. For example, the backlight unit under the liquid crystal panel supplies light to the liquid crystal panel. The main frame surrounds the liquid crystal panel and the backlight unit. The top frame surrounds a top boundary region of the liquid crystal panel and the bottom frame covers a rear surface of the backlight unit. The main frame, the top frame and the bottom frame may be coupled by the hook 120. The main frame, the top frame and the bottom frame correspond to the middle supporting means 160, the upper supporting means 130 and the lower supporting means 140, respectively.

Figure 2A:
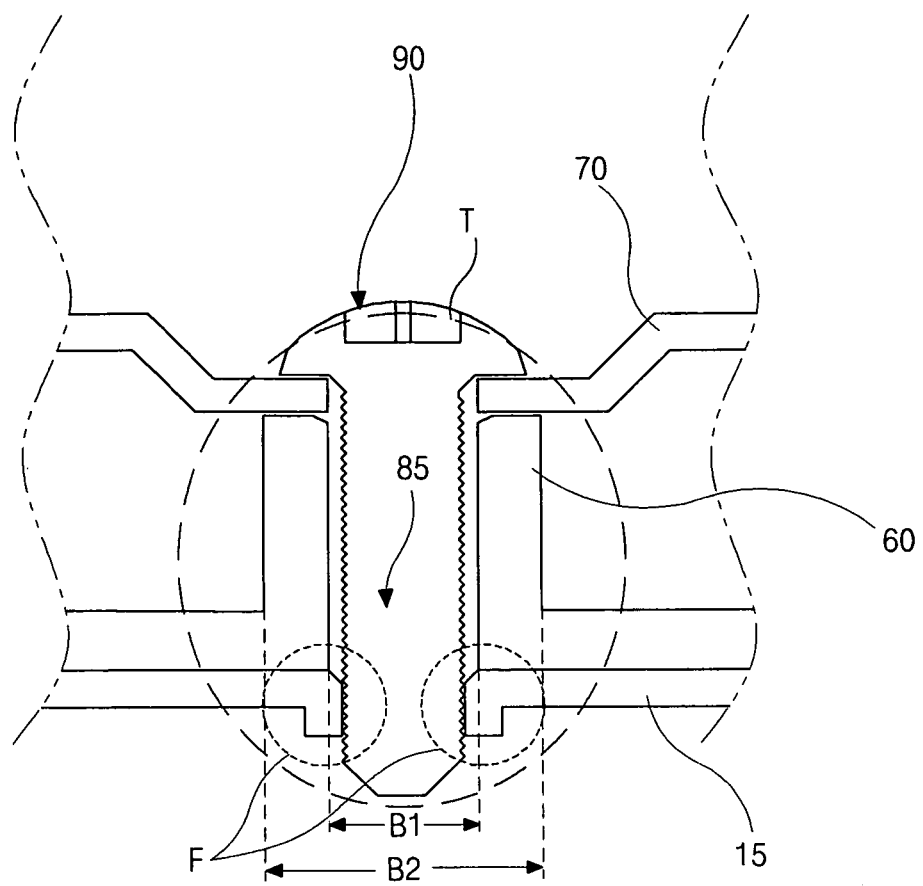
FIGS. 2A and 2B are cross-sectional views showing an exemplary coupling portion and another exemplary coupling portion, respectively, for a multi-vision display device according to the related art.
Figure 2B:
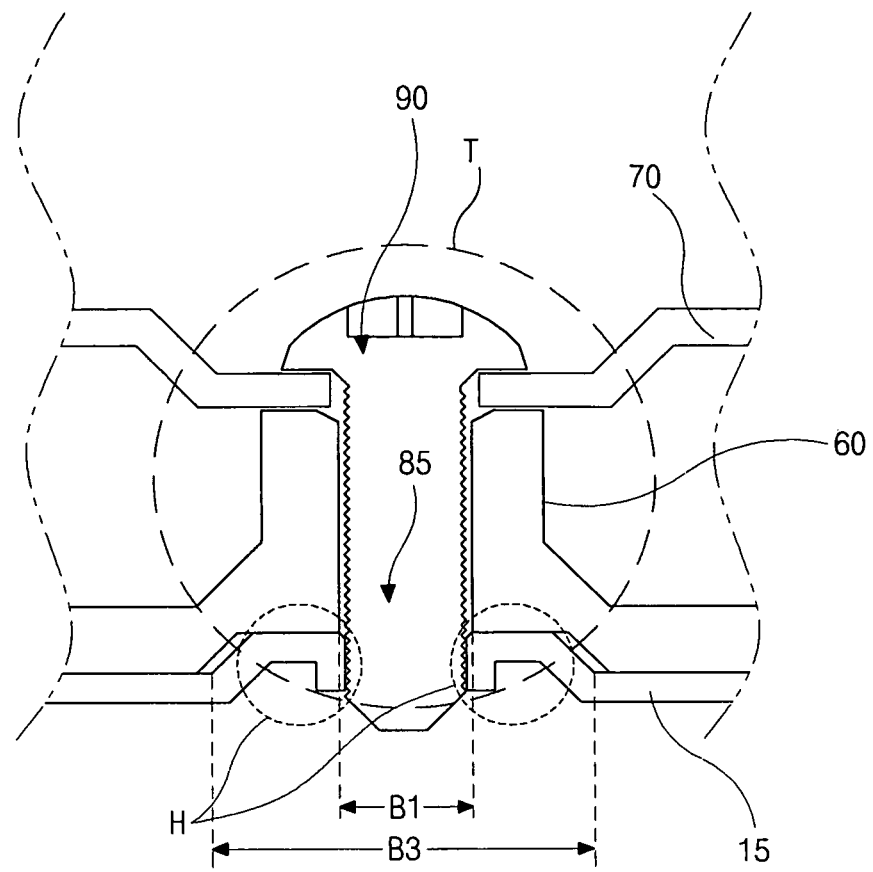

The hook 120 has a plate shape having a length L along the x-axis and a width W along the y-axis. Since the hook 120 is formed to have the width W less than a half of the first diameter B1 (of FIGS. 2A and 2B) even when the hook 120 has length L greater than the first diameter B1, the area for the coupling means T is reduced.

When the hook 120 is applied to a multi-vision display device, the upper and lower supporting means 130 and 140 are stably combined using the hook 120 without an additional mold and the active area is maximized due to reduction in the area for the coupling means T. For example, the length of the lower extension 120c may be smaller than the length of the upper extension 120b. Accordingly, after the lower extension 120c is combined with the lower supporting means 140, the upper extension 120b is combined with the upper supporting means 130. Since the hook 120 is combined with the upper and lower supporting means 130 and 140 without using a driver for a screw, the assemblage is simplified and productivity is improved.

Figure 4A:
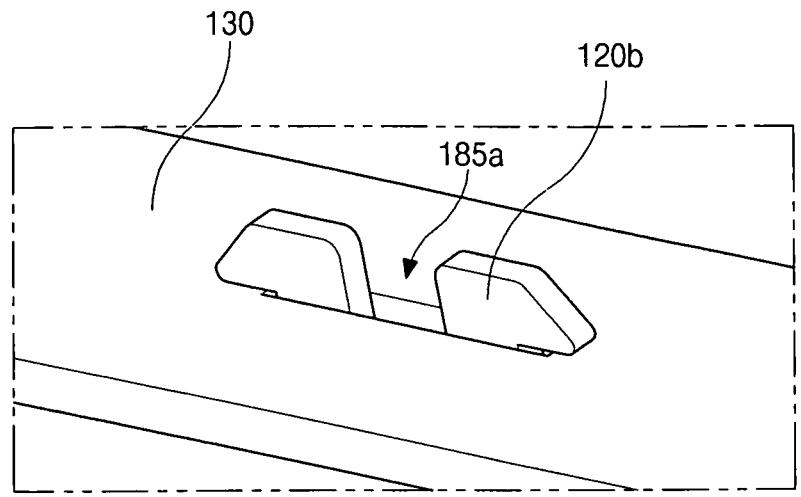
FIG. 4A is a magnified view showing a coupling means for a multi-vision display device according to a first embodiment of the present invention.
Figure 4B:
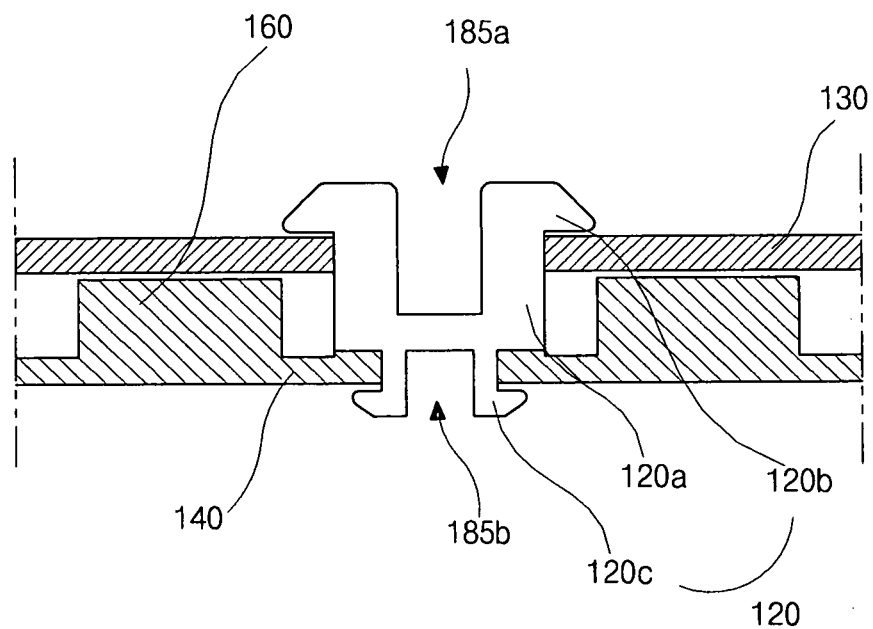
FIG. 4B is a cross-sectional view taken along a line IVB-IVB of FIG. 3B.

FIG. 4A is a magnified view showing a coupling means for a multi-vision display device according to a first embodiment of the present invention, and FIG. 4B is a cross-sectional view taken along a line IVB-IVB of FIG. 3B.

In FIGS. 4A and 4B, the upper and lower supporting means 130 and 140 are combined with each other using the hook 120. The upper and lower extensions 120b and 120c of the hook 120 contact the upper and lower supporting means 130 and 140, respectively. The upper and lower supporting means 130 and 140 include upper and lower through holes 185a and 185b, respectively, which correspond to the upper and lower extensions 120b and 120c. Accordingly, the upper and lower supporting means 130 and 140 are assembled by inserting the lower extension 120c of the hook 120 sequentially through the upper and lower through holes 185a and 185b. Since the width W of the hook 120 along the y-axis is sufficiently reduced, a narrow type LCD device or a narrow type multi-vision display device is obtained.

Figure 5A:
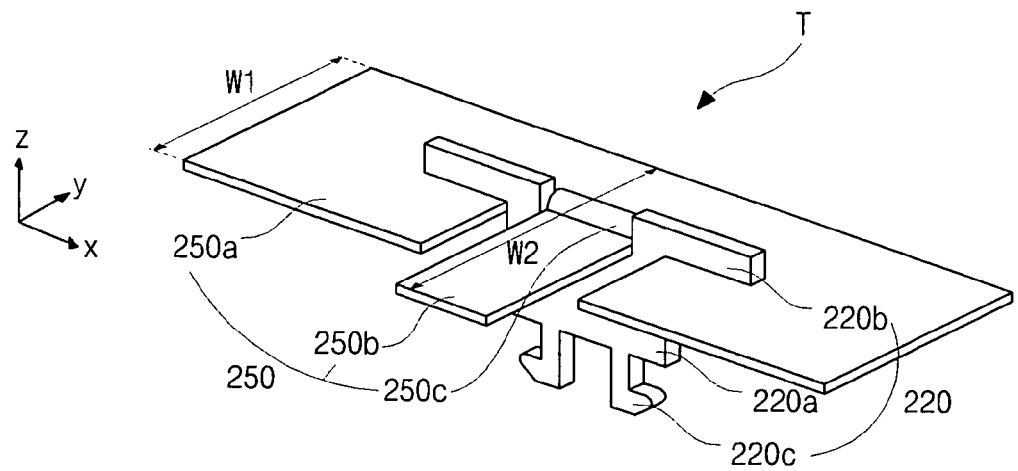
FIG. 5A is a perspective view showing a hook and a plate spring of a coupling means for a multi-vision display device according to a second embodiment of the present invention.
Figure 5B:
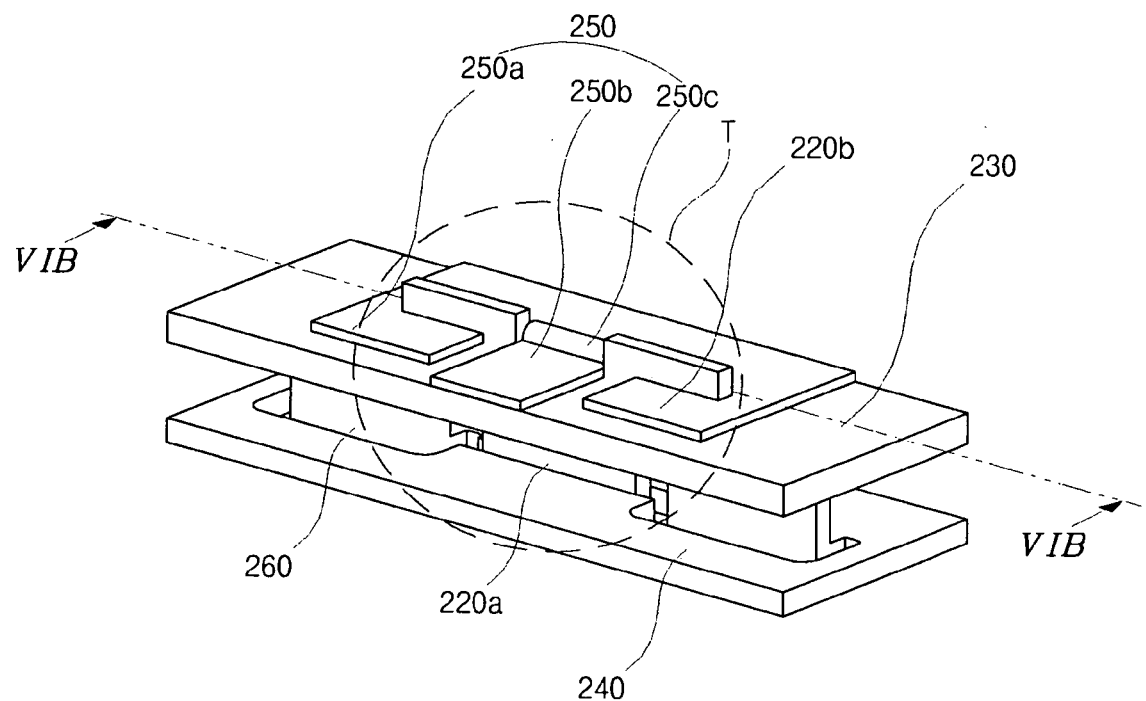
FIG. 5B is a perspective view showing a multi-vision display device in an assembled state according to a second embodiment of the present invention.
Figure 5C:
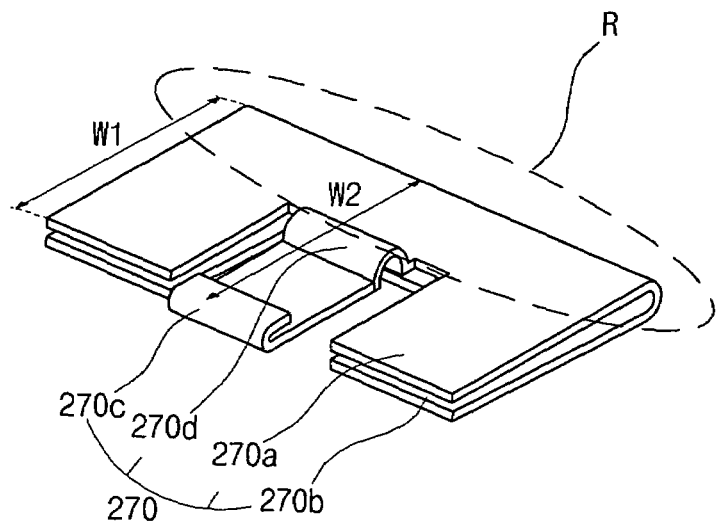
FIG. 5C is a perspective view showing a plate spring of a coupling means according to another embodiment of the present invention.

FIG. 5A is a perspective view showing a hook and a plate spring of a coupling means for a multi-vision display device according to a second embodiment of the present invention, FIG. 5B is a perspective view showing a multi-vision display device in an assembled state according to a second embodiment of the present invention, and FIG. 5C is a perspective view showing a plate spring of a coupling means according to another embodiment of the present invention.

In FIGS. 5A and 5B, upper and lower supporting means 230 and 240 are vertically spaced apart from each other, and a middle supporting means 260 is disposed between the upper and lower supporting means 230 and 240. The upper, middle and lower supporting means 230, 260 and 240 are combined with each other by a hook 220 and a plate spring 250 of a coupling means T. The hook 220 includes a body 220a, an upper extension 220b and a lower extension 220c. In addition, the plate spring 250 of a single layer includes a flat portion 250a, a protruding portion 250b bent and protruding from a center of the flat portion 250b and an arc portion 250c elastically connecting the flat portion 250a and the protruding portion 250c. The flat portion 250a has a first width WI along the y-axis, while the protruding portion 250b has a second width W2 along the y-axis greater than the first width W1. Since the flat portion 250a is disposed under the hook 220 with respect to the z-axis to contact the top surface of the body 220a, and the protruding portion 250b is disposed over the hook 220 with respect to the z-axis to contact the bottom surface of the upper extension 220b when coupled, the plate spring 250 provides an elastic downward pressure to the hook 220 so that a coupling force of the upper and lower supporting means 230 and 240 can be strengthened. For improved elasticity, the protruding portion 250b may be disposed lower than the flat portion 250a with respect to the z-axis. As a result, the plate spring 250 fixes the upper extension 220b of the hook 220 to the upper supporting means 230.

The body 220a has a rectangular plate, and the upper extension 220b horizontally extends from top side ends of the body 220a toward outside along an x-axis. The lower extension 220c vertically extends from a bottom end of the body 220a along a z-axis and then horizontally bends toward outside along the x-axis. The upper extension 220b is parallel to the upper supporting means 230 so that the upper extension 220b can be fixed to the upper supporting means 230, and the lower extension 220c has a pair of L-shaped plates so that the lower extension 220c can be fixed to the lower supporting means 240. For the purpose of strengthen the coupling force, the top surface of the body 220a and the bottom surface of the upper extension 220b may have substantially the same horizontal level and the upper extension 220b may extend to increase an overlap area with the upper supporting means 230. For example, the upper extension 220b of the second embodiment may have a longer flat portion contacting the flat portion 250a of the plate spring 250 as compared with the upper extension 120b of the first embodiment. As a result, the hook 220 may be formed such that the body 220a and the upper extension 220b form a right angle. In addition, the hook 220 has a symmetric shape with respect to a central vertical line. The body 220a, the upper extension 220b and the lower extension 220c of the hook 220 may have a single body of an elastic material.

The middle supporting means 260 is disposed at both sides of the hook 220 to support and separate the upper and lower supporting means 230 and 240. For example, the middle supporting means 260 may be integrated with or may be independently formed from the lower supporting means 240. The upper and lower supporting means 230 and 240 may be separated from each other by a predetermined distance due to the middle supporting means 260.

The plate spring 250 may include a double layer in another embodiment. As shown in FIG. SC, the plate spring 270 of a double layer includes an upper flat portion 270a, a lower flat portion 270b facing and spaced apart from the upper flat portion 270a, a protruding portion 270c bent and protruding from a center of the upper flat portion 270a, an arc portion 270d connecting the upper flat portion 270a and the protruding portion 270c. The upper and lower flat portions 270a and 270b are connected to each other through a bent portion R. Each of the upper and lower flat portions 270a and 270b has a first width W1 along the y-axis, while the protruding portion 270b has a second width W2 along the y-axis greater than the first width W1. Since the upper flat portion 270a is disposed under the hook 220 with respect to the z-axis to contact the bottom surface of the upper extension 220b, and the protruding portion 270b is disposed over the hook 220 with respect to the z-axis to contact the top surface of the body 220a when coupled, the plate spring 270 of the double layer provides an elastic downward pressure to the upper extension 220b of the hook 220 so that a coupling force for the upper and lower supporting means 230 and 240 can be strengthened. To improve elasticity, the protruding portion 270c may be disposed lower than the upper flat portion 270a with respect to the z-axis. In addition, since the lower flat portion 270b is also disposed lower than the upper flat portion 270a with respect to the z-axis by the bent portion R, the plate spring 270 of the double layer further provides elasticity to the coupling means and further strengthens a coupling force of the upper and lower supporting means 230 and 240. An end portion of the protruding portion 270c may have a round shape through a hemming process.

Figure 6A:
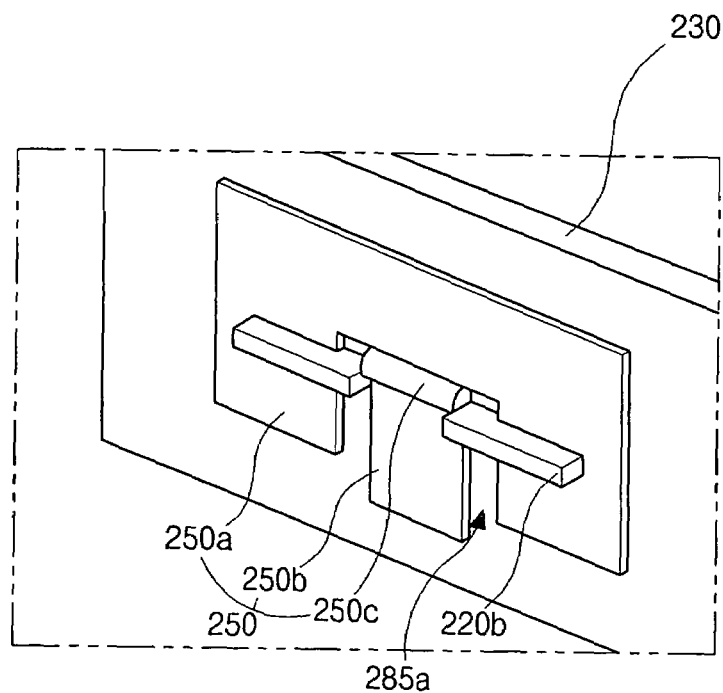
FIG. 6A is a magnified view showing a coupling means for a multi-vision display device according to a second embodiment of the present invention.
Figure 6B:
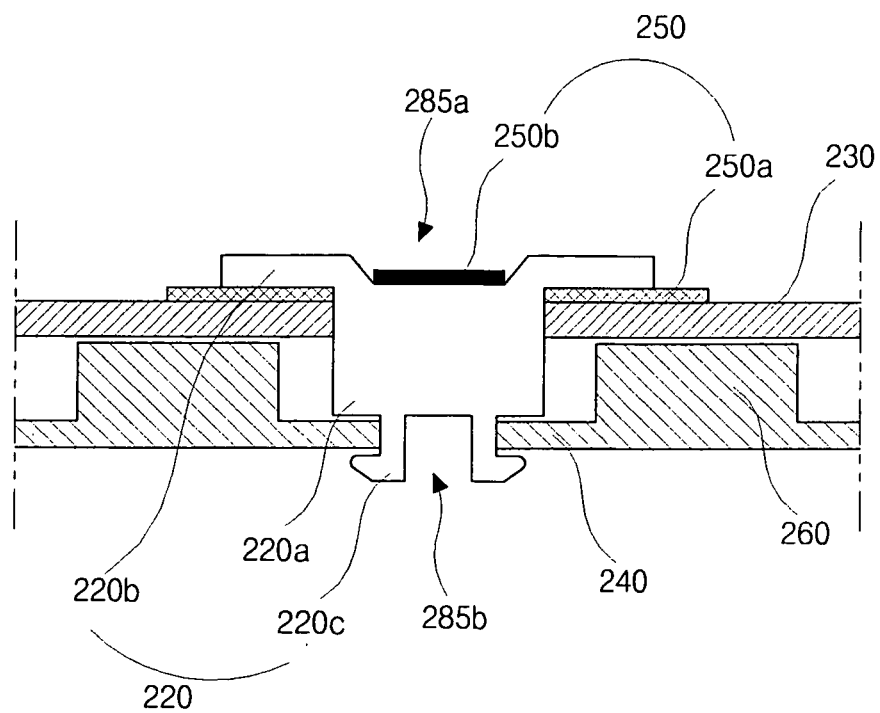
FIG. 6B is a cross-sectional view taken along a line VIB-VIB of FIG. 5B.
Figure 6C:
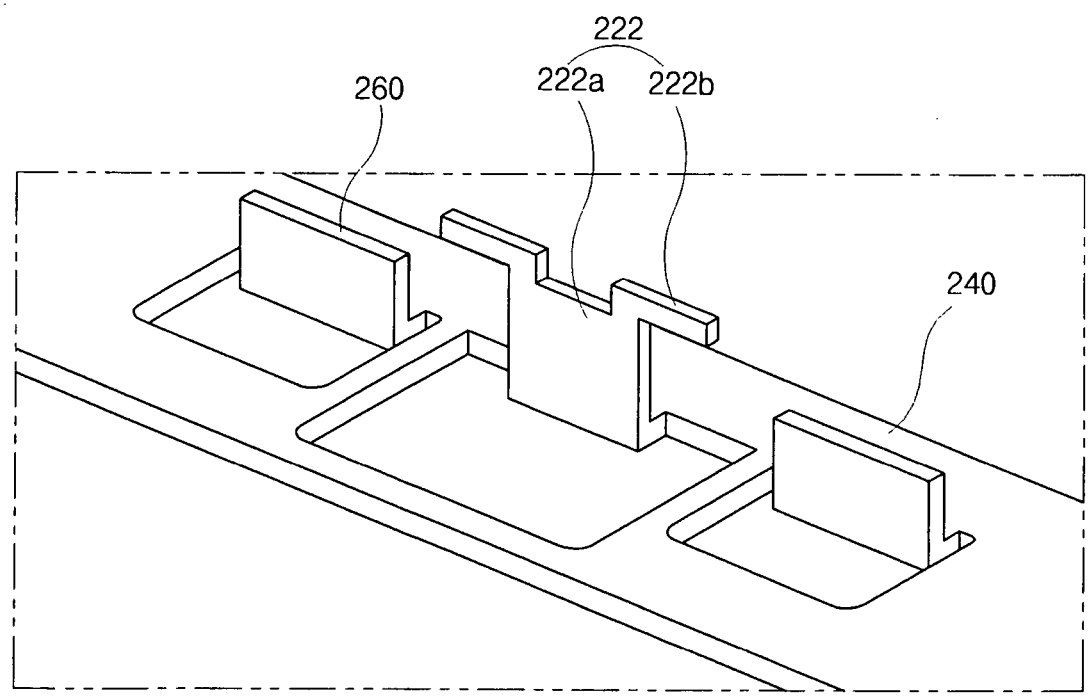
FIG. 6C is a perspective view showing a hook of a coupling means according to another embodiment of the present invention.

FIG. 6A is a magnified view showing a coupling means for a multi-vision display device according to a second embodiment of the present invention, FIG. 6B is a cross-sectional view taken along a line VIB-VIB of FIG. 5B, and FIG. 6C is a perspective view showing a hook of a coupling means according to another embodiment of the present invention.

In FIGS. 6A and 6B, the upper and lower supporting means 230 and 240 are combined with each other using the hook 220 and the plate spring 250. The lower extension 220c contacts the lower supporting means 240. In addition, the flat portion 250a of the plate spring 250 is disposed between the upper extension 220b and the upper supporting means 230, and the protruding portion 250b of the plate spring 250 contacts the body 220a of the hook 220. The upper and lower supporting means 230 and 240 include upper and lower through holes 285a and 285b, respectively, which correspond to the upper and lower extensions 220b and 220c. Accordingly, after the upper and lower supporting means 230 and 240 are assembled by inserting the lower extension 220c of the hook 220 sequentially through the upper and lower through holes 285a and 285b, the plate spring 250 is inserted such that the flat portion 250a is disposed between the upper extension 220b and the upper supporting means 230 and the protruding portion 250b is disposed over the body 220a. As a result, the upper and lower supporting means 230 and 240 are more stably combined with each other using the coupling means T including the hook 220 and the plate spring 250.

The hook may be integrated with the lower supporting means 240 in another embodiment. As shown in FIG. 6C, a middle supporting means 260 and a hook 222 are integrated with a lower supporting means 240. The hook 222 includes a body 222a vertically extending from the lower supporting means 240 and an upper extension 222b horizontally extending from top side ends of the body 222a toward outside along the x-axis. Accordingly, when the upper and lower supporting means 230 and 240 are combined with each other using the hook 22 and the plate spring 250, the coupling force of the upper and lower supporting means 230 and 240 are further strengthened. In addition, the assemblage is further simplified and productivity is improved.

Moreover, since the width W of the hook 220 along the y-axis is sufficiently reduced in the second embodiment, a narrow type LCD device or a narrow type multi-vision display device is obtained.

Figure 7A:
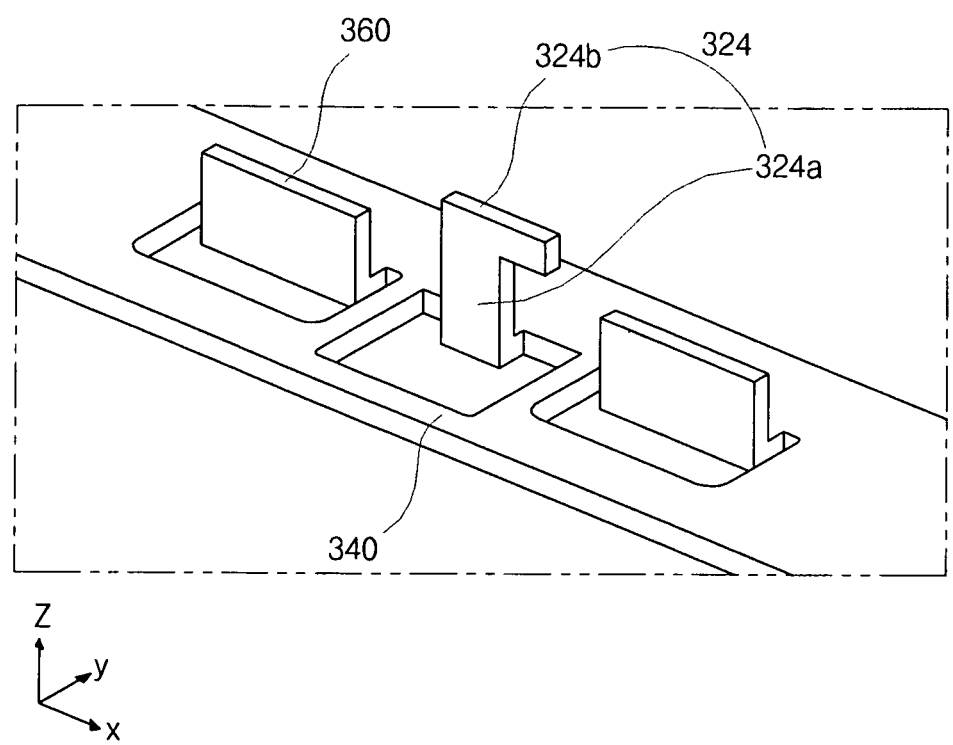
FIG. 7A is a perspective view showing a sliding hook of a coupling means for a multi-vision display device according to a third embodiment of the present invention.
Figure 7B:
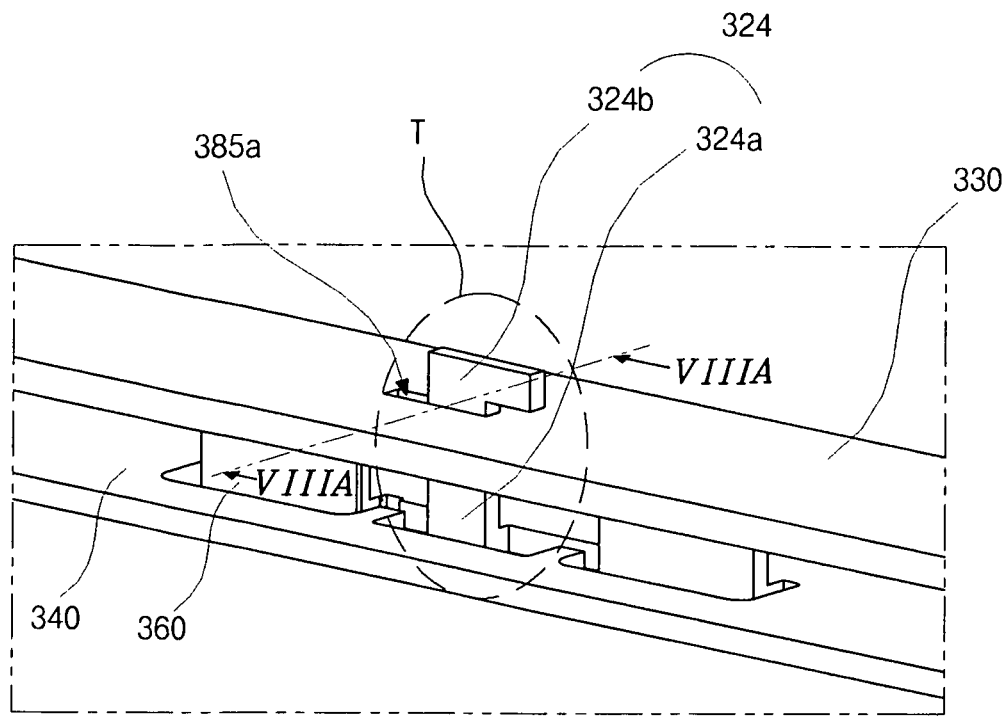
FIG. 7B is a perspective view showing a multi-vision display device in an assembled state according to a second embodiment of the present invention.
Figure 7C:
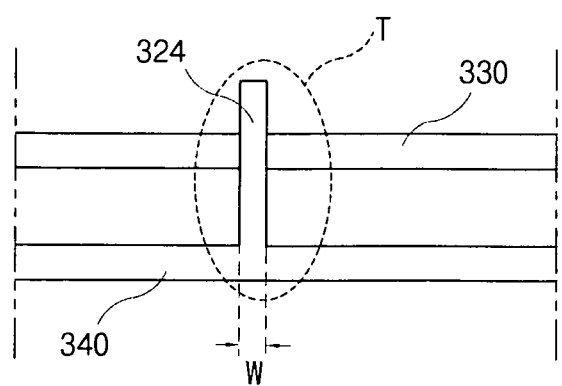
FIG. 7C is a cross-sectional view taken along a line VIIIA-VIIIA of FIG. 7B.

FIG. 7A is a perspective view showing a sliding hook of a coupling means for a multi-vision display device according to a third embodiment of the present invention, FIG. 7B is a perspective view showing a multi-vision display device in an assembled state according to a second embodiment of the present invention, and FIG. 7C is a cross-sectional view taken along a line VIIIA-VIIIA of FIG. 7B.

In FIGS. 7A and 7B, upper and lower supporting means 330 and 340 are vertically spaced apart from each other, and a middle supporting means 360 is disposed between the upper and lower supporting means 330 and 340. The upper, middle and lower supporting means 330, 360 and 340 are combined with each other by a sliding hook 324 of a coupling means T. The sliding hook 324 is integrated with the lower supporting means 340. In addition, the sliding hook 324 includes a body 324a vertically extending from the lower supporting means 340 and an upper extension 324b horizontally extending from top side ends of the body 220a toward outside along an x-axis. The body 324a has a rectangular plate shape. The upper supporting means 330 includes an upper through hole 385a corresponding to the body 324a. Accordingly, the upper and lower supporting means 330 and 340 are combined with each other by horizontally sliding the sliding hook 324 after the upper extension 324b is inserted through the upper through hole 385a.

The middle supporting means 360 is disposed at both sides of the sliding hook 324 to support and separate the upper and lower supporting means 330 and 340. For example, the middle supporting means 360 may be integrated with or may be independently formed from the lower supporting means 340. The upper and lower supporting means 330 and 340 may be separated from each other by a predetermined distance due to the middle supporting means 360.

When the upper and lower supporting means 330 and 340 are combined using the sliding hook 324, an auxiliary coupling means such as a screw may be required at end portions of the upper and lower supporting means 330 and 340 for improving a coupling force. In addition, the sliding hook 324 has an advantage when applied to a multi-vision display device.

As shown in FIG. 7C, the upper and lower supporting means 330 and 340 are combined with each other using the sliding hook 324. The sliding hook 324 has a plate shape having a width W less than a half of the first diameter B1 (of FIGS. 2A and 2B) along the y-axis. Accordingly, the area for the sliding hook 324 of the coupling means T is smaller than the area for the screw 90 (of FIGS. 2A and 2B) requiring the second and third diameters B2 and B3 (of FIGS. 2A and 2B). As a result, a narrow type LCD device or a narrow type multi-vision display device is obtained.

Figure 8:
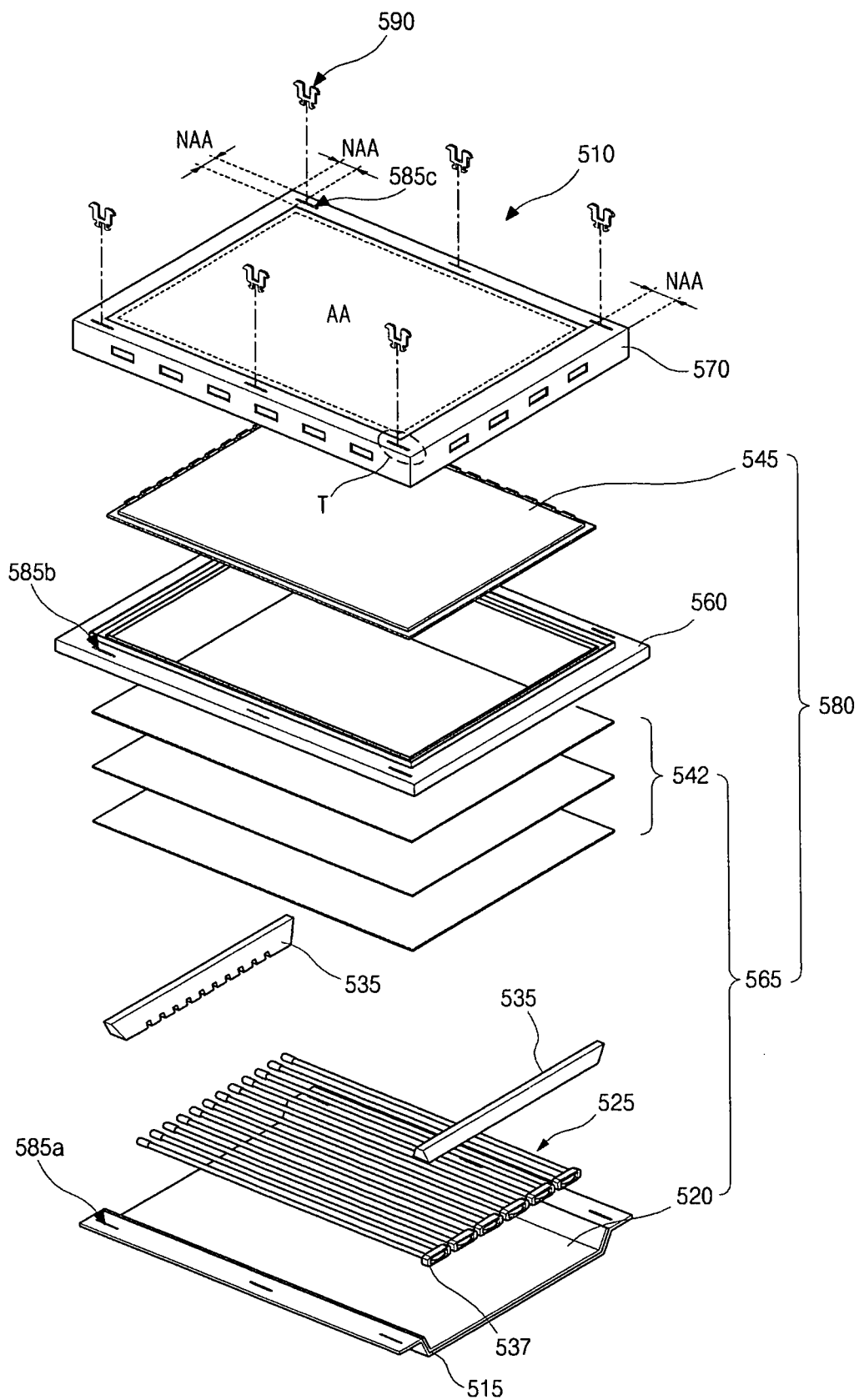
FIG. 8 is a perspective view showing a liquid crystal display module according to an embodiment of the present invention.

FIG. 8 is a perspective view showing a liquid crystal display module according to an embodiment of the present invention.

In FIG. 8, an LCD module 510 includes a bottom frame 515, a reflective plate 520, a lamp 525, a side supporter 535, a lamp holder 537, a plurality of optical means 542, a liquid crystal panel 545, a main frame 560, a top frame 570, a plurality of coupling means T. The reflective plate 520 is disposed on the bottom frame 515 and reflects the scattered light. The lamp 525 is parallel to and spaced apart from the reflective plate 520. For example, the lamp 525 may have a U shape having a bent portion. The lamp holder 537 fixes the bent portion of the lamp 525 and the side supporter 535 fixes each end of the lamp 525. The light from the lamp 525 is enhanced by the plurality of optical means 542 over the lamp 525. The liquid crystal panel 545 is disposed over the plurality of optical means 542. The main frame 560 surrounds the liquid crystal panel 545, and the top frame 570 surrounds a top edge of the liquid crystal panel 545. The bottom, main and top frames 515, 560 and 570 are combined by the plurality of coupling means T to fix and support the liquid crystal panel 545. Each of the plurality of coupling means T includes a hook 590 and each of the bottom, main and top frames 515, 560 and 570 includes a through hole 585a, 585b and 585c corresponding to the hook 590.

The bottom and top frames 515 and 570 may include a metal and may be formed through a press process. In addition, the main frame 560 may include a plastic and may be formed through a mold process. The reflective plate 520, the lamp 525, the side supporter 535, the lamp holder 537 and the plurality of optical means 542 constitute a backlight unit 565. The lamp 525 may include one of a cold cathode fluorescent lamp (CCFL), a hot cathode fluorescent lamp (HCFL), an external electrode fluorescent lamp (EEFL) and a light emitting diode (LED).

Figure 1:
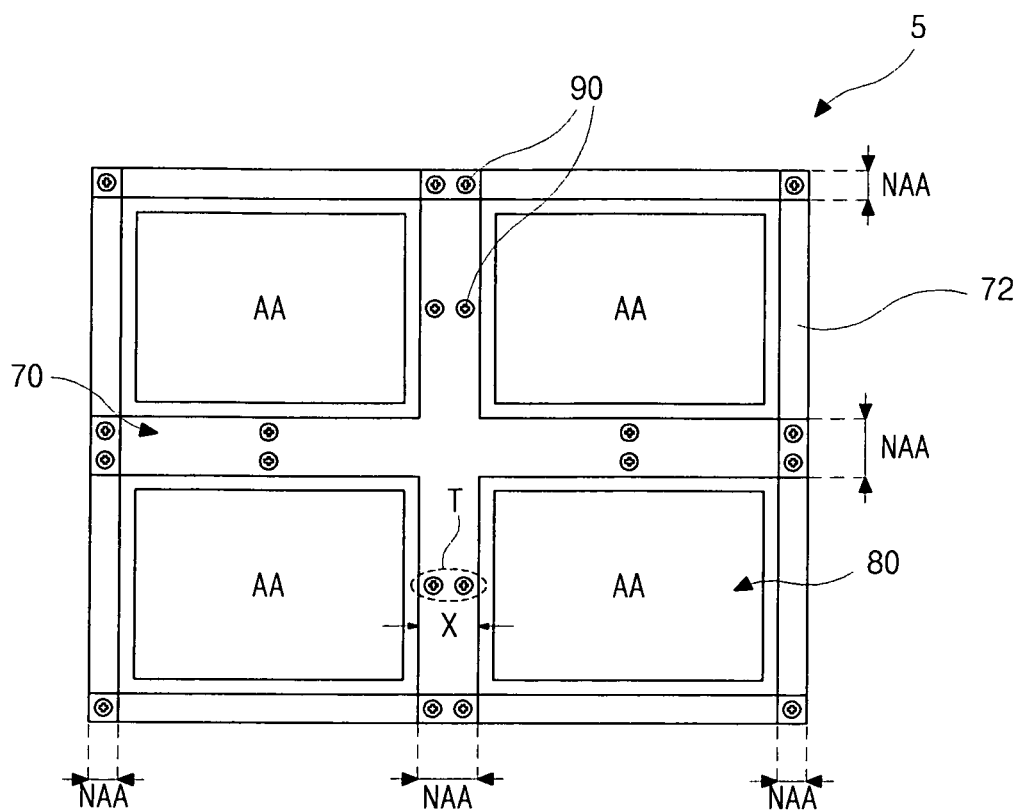
FIG. 1 is a plan view showing a multi-vision display device according to the related art.

The LCD module 510 has an active area AA and a non-active area NAA, which may be referred to as a bezel region, surrounding the active area AA. The active area AA is used for displaying images, while the non-active area NAA is not used for displaying images. The hook 590 and the through holes 585a, 585b and 585c of each coupling means T correspond to the non-active area NAA. The bottom, main and top frames 515, 560 and 570 are combined with each other using the plurality of coupling means T. Since the width of the hook 590 is smaller than a half of the width of the screw 90 (of FIG. 1), the non-active area NAA is reduced so that a narrow type LCD module can be obtained. Moreover, each coupling means T may include a plate spring and a coupling means including a sliding hook may be applied to the LCD module for more stable coupling and further simplified assemblage.

Figure 9:
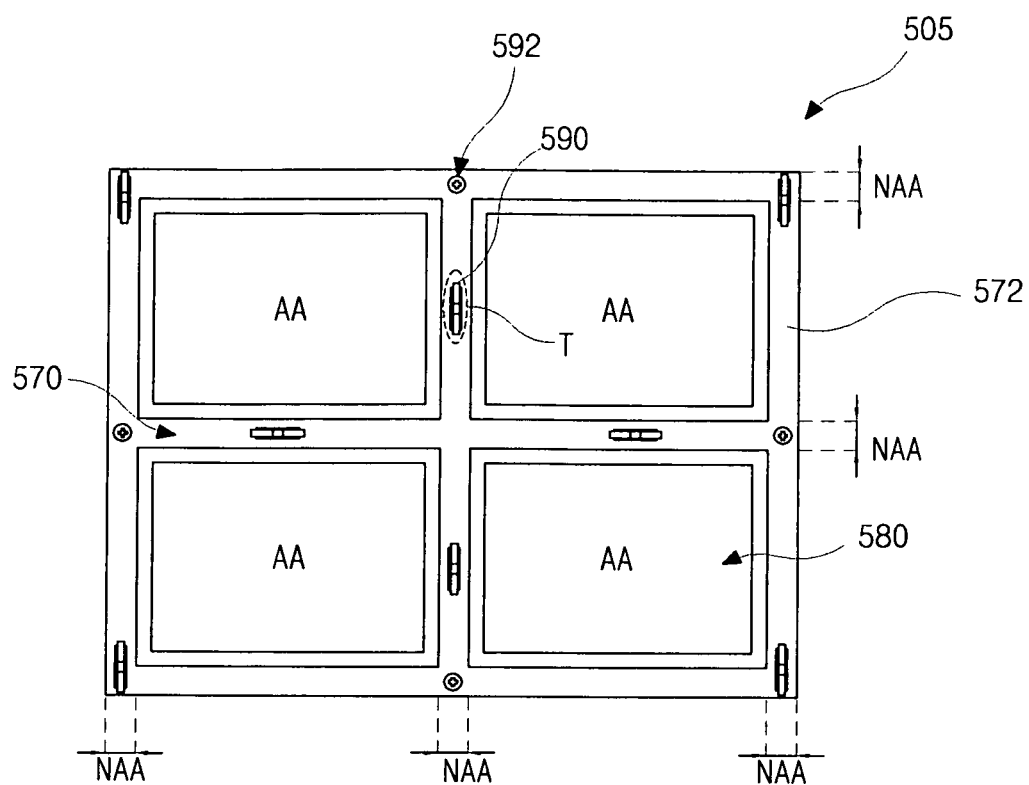
FIG. 9 is a plan view showing a multi-vision display device according to an embodiment of the present invention.

FIG. 9 is a plan view showing a multi-vision display device according to an embodiment of the present invention.

In FIG. 9, a multi-vision display device 505 includes a plurality of LCD devices 580 in matrix. The plurality of LCD devices 580 may display individual images or the same images. For example, the multi-vision display device 505 may display a single image by displaying partial images constituting the single image by the plurality of LCD devices 580.

The multi-vision display device 505 further includes a frame 572, an upper supporting means 570, a lower supporting means (not shown) and a plurality of coupling means T. The frame 572 has a rectangular ring shape and the plurality of LCD devices 580 are disposed on the frame 572 to be separated from each other. The upper supporting means 570 and the lower supporting means face and are spaced apart from each other. The upper supporting means 570 and the lower supporting means may be formed by a press process. The upper supporting means 570 corresponds to gaps between the plurality of LCD devices 580 and supports the plurality of LCD devices 580 at an upper position.

The upper supporting means 570 and the lower supporting means are combined by the plurality of coupling means T to fix and support the plurality of LCD devices 580. Each of the plurality of coupling means T includes a hook 590 and each of the upper supporting means 570 and the lower supporting means includes a through hole (not shown) corresponding to the hook 590. The multi-vision display device has an active area AA and a non-active area NAA surrounding the active area AA. The hook 590 and the through hole of each coupling means T are disposed to correspond to the non-active area NAA. The upper supporting means 570 and the lower supporting means are combined with each other using the plurality of coupling means T. For example, the hook 590 and the through hole may be disposed in the non-active area NAA between adjacent LCD devices 580 to minimize the influence of the non-active area NAA on the displayed image. Since the width of the hook 590 is smaller than the width of the screw 90 (of FIG. 1), the non-active area NAA is reduced so that a narrow type multi-vision display device can be obtained. Moreover, each coupling means T may include a plate spring and a coupling means including a sliding hook may be applied to the multi-vision display device for more stable coupling and further simplified assemblage.

When a sliding hook is applied to the multi-vision display device, the upper supporting means 570 and the lower supporting means may be combined using a plurality of auxiliary screws 592 at the end portions thereof to complement the coupling force by the coupling means T in the non-active area NAA between the adjacent LCD devices 580.

Consequently, in the liquid crystal display module or in the multi-vision display device according to the present invention, since the coupling means including a plate-shaped hook is used for assembly, an active area for displaying images is increased and a non-active area surrounding the active area is reduced. As a result, a coupling force is strengthened and assemblage is simplified. In addition, productivity is improved.

It will be apparent to those skilled in the art that various modifications and variations can be made in a coupling means and a display device using the coupling means of the present invention without departing from the spirit or scope of the invention. Thus, it is intended that the present invention cover the modifications and variations of this invention provided they come within the scope of the appended claims and their equivalents.

What is claimed is:

1. A display module, comprising:
    upper and lower supporting means facing and spaced apart from each other;
    a display device between the upper and lower supporting means;
    a middle supporting means surrounding the display device; and
    a plurality of coupling means combining the upper, middle and lower supporting means to fix and support the display device, wherein the middle supporting means are arranged at both sides of the coupling means,
    wherein each of the plurality of coupling means includes a hook and each of the upper and lower supporting means has a through hole corresponding to the hook, and
    wherein the hook comprises:
    a body having a single U-shape, the body having a flat bottom surface;
    upper extensions horizontally extending from top side ends of the body toward outside along an x-axis, each of the upper extensions having a flat bottom surface; and
    lower extensions each having a first portion vertically extending from a bottom end of the body along a z-axis and a second portion horizontally bending toward outside along the x-axis, each of the second portions having a flat top surface,
    wherein the coupling means has plate shape having a length L along the x-axis and a width W along the y-axis, wherein a length of the second portion of the lower extensions is less than a length of the upper extensions,
    wherein the lower extensions have a pair of L shaped plates oppositely disposed to each other, and
    wherein the flat bottom surface of each of the upper extensions contacts a top surface of the upper supporting means and the flat top surface of each of the second portions contacts a bottom surface of the lower supporting means.

2. The display module according to claim 1, wherein the bottom surface of the body contacts a top surface of the lower supporting means.

3. The display module according to claim 1, wherein a distance between the flat bottom surface of each of the upper extensions and the flat top surface of each of the second portions corresponds to a thickness of the upper, middle and lower supporting means, and a distance between the flat bottom surface of the body and the flat top surface of each of the second portions corresponds to a thickness of the lower supporting means.

4. A liquid crystal display module, comprising:
a bottom frame;
a reflective plate on the bottom frame;
a lamp over the reflective plate;
a side supporter fixing ends of the lamp;
a plurality of optical means over the lamp;
a liquid crystal panel over the plurality of optical means;
a main frame surrounding the liquid crystal panel;
a top frame surrounding a top edge of the liquid crystal panel;
a plurality of coupling means combining the bottom, main and top frames to fix and support the liquid crystal panel,
wherein each of the plurality of coupling means includes a hook and each of the bottom, main and top frames has a through hole corresponding to the hook, and
wherein the hook comprises:
a body having a single U-shape, the body having a flat bottom surface;
upper extensions horizontally extending from top side ends of the body toward outside along an x-axis, each of the upper extensions having a flat bottom surface; and
lower extensions each having a first portion vertically extending from a bottom end of the body along a z-axis and a second portion horizontally bending toward outside along the x-axis, each of the second portions having a flat top surface,
wherein the coupling means has plate shape having a length L along the x-axis and a width W along the y-axis,
wherein a length of the second portion of the lower extensions is less than a length of the upper extensions,
wherein the lower extensions have a pair of L shaped plates oppositely disposed to each other, and
wherein the flat bottom surface of each of the upper extensions contacts a top surface of the top frame and the flat top surface of each of the second portions contacts a bottom surface of the bottom frame.

5. The liquid crystal display module according to claim 4, wherein the lamp includes one of a cold cathode fluorescent lamp (CCFL), a hot cathode fluorescent lamp (HCFL), an external electrode fluorescent lamp (EEFL) and a light emitting diode (LED).

6. The liquid crystal display module according to claim 4, wherein the bottom surface of the body contacts a top surface of the bottom frame.

7. The liquid crystal display module according to claim 4, wherein a distance between the flat bottom surface of each of the upper extensions and the flat top surface of each of the second portions corresponds to a thickness of the top, main and bottom frames, and a distance between the flat bottom surface of the body and the flat top surface of each of the second portions corresponds to a thickness of the bottom frame.

* * * * *